United States Patent Office 3,124,586
Patented Mar. 10, 1964

3,124,586
1-PIPERIDYL-LOWER-ALKANOYLANILIDES
Bernard L. Zenitz, Colonie, N.Y., assignor to Sterling
Drug Inc., New York, N.Y., a corporation of Delaware
No Drawing. Filed Sept. 28, 1959, Ser. No. 842,562
17 Claims. (Cl. 260—294)

This invention relates to new piperidyl-lower-alkanoyl-anilides, their acid-addition and quaternary ammonium salts and to methods for the preparation thereof.

Piperidyl-lower-alkanoylanilides unsubstituted in the piperidine ring are known. The invention here resides in the concept of such known types of piperidyl-lower-alkanoylanilides wherein the piperidine ring is substituted by a member of the group consisting of hydroxy or hydroxy-lower-alkyl radicals and ethers and carboxylic and carbamic acid esters thereof, or carbo-lower-alkoxy, carbamyl, or lower-alkanoylamino radicals and salts thereof whereby new and useful compounds are obtained.

A preferred aspect of the invention relates to compounds having the formula

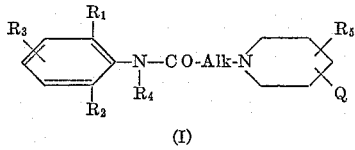

(I)

wherein $R_1$ and $R_2$ represent lower-alkyl radicals, each $R_3$ and $R_4$ represent a hydrogen atom or a lower-alkyl radical, $R_5$ represents a member of the group consisting of a hydrogen atom and from one to five lower-alkyl radicals, Q represents a member of the group consisting of hydroxy, lower-alkoxy, lower-alkanoyloxy, monocarbocyclic aroyloxy, unsubstituted carbamyloxy, N-lower-alkylcarbamyloxy, N,N-di-lower-alkylcarbamyloxy, hydroxy-lower-alkyl, lower-alkoxy-lower-alkyl, lower-alkanoyloxy-lower-alkyl, monocarbocyclic aroyloxy-lower-alkyl, unsubstituted carbamyloxy-lower-alkyl, N-lower-alkylcarbamyloxy-lower-alkyl, N,N - di - lower - alkylcarbamyloxy-lower-alkyl, carbo-lower-alkoxy, unsubstituted carbamyl, N-lower-alkyl carbamyl, N,N-di-lower-alkyl carbamyl and lower-alkanoylamino radicals, and Alk represents a lower-alkylene radical.

In the above general Formula I, $R_1$ and $R_2$ represent lower-alkyl radicals. The lower-alkyl radicals can be the same or different, can be straight or branched and can contain from one to about four carbon atoms. Thus $R_1$ and $R_2$ represent such radicals inter alia, as methyl, ethyl, isopropyl, n-butyl, t-butyl and the like.

In the above general Formula I, each of $R_3$ and $R_4$ represents a hydrogen atom or a lower-alkyl radical. When $R_3$ or $R_4$ represents a lower-alkyl radical, it can be straight or branched and can contain from one to about four carbon atoms, and when $R_3$ represents a lower-alkyl radical, it can occupy either the 3-, 4- or 5-position of the benzene ring. Thus $R_3$ and $R_4$ include such radicals, inter alia, as methyl, ethyl, n-propyl, n-butyl and t-butyl.

In the above general Formula I, $R_5$ represents a hydrogen atom or from one to five lower-alkyl radicals. When $R_5$ represents one or more lower-alkyl radicals, each lower-alkyl radical can contain from one to about four carbon atoms, can be either straight or branched and can occupy any of the five available positions on the piperidine ring, and when $R_5$ represents more than one lower-alkyl radical, said lower-alkyl radicals can be the same or different and can occupy the same or different positions on the piperidine ring. Thus $R_5$ represents, inter alia, methyl, ethyl, isopropyl, n-butyl, isobutyl and the like.

In the above general Formula I, Q represents a hydroxy or a hydroxy-lower-alkyl radical or lower-alkoxy ethers or lower-alkanoyloxy, monocarbocyclic aroyloxy and carbamyloxy esters thereof or a carbo-lower-alkoxy, carbamyl, or lower-alkanoylamino radical. When Q represents a hydroxy radical or a lower-alkoxy ether or a lower-alkanoyloxy, monocarbocyclic aroyloxy or carbamyloxy ester thereof, or when Q represents a lower-alkanoylamino radical, said radicals can occupy either the 3- or the 4-positions of the piperidine ring. When Q represents a hydroxy-lower-alkyl radical or a lower alkoxy ether or a lower-alkanoyloxy, monocarbocyclic aroyloxy or carbamyloxy ester thereof, or when Q represents a carbo-lower-alkoxy or a carbamyl radical, said radicals can occupy any of the three available positions of the piperidine ring.

When Q represents a hydroxy-lower-alkyl radical or a lower-alkoxy ether or a lower-alkanoyloxy, monocarbocyclic aroyloxy, or carbamyloxy ester thereof, the hydroxy-lower-alkyl radical can be straight or branched and can contain from one to about six carbon atoms. Q thus stands, inter alia, for hydroxymethyl, 1-hydroxyethyl, 2-hydroxyethyl, 3-hydroxypropyl, 4-hydroxybutyl, 5-hydroxypentyl, 6-hydroxyhexyl and the like.

When Q represents a lower-alkoxy ether or a lower-alkanoyloxy ester of a hydroxy or hydroxy-lower-alkyl radical or when Q represents a lower-alkanoylamino radical, the lower-alkoxy or lower-alkanoyl portion of said radicals can be either straight or branched and can contain from one to about six carbon atoms. Q thus also stands, inter alia, for methoxy, 2-methoxyethyl, isopropoxy, 2-isopropoxyethyl, hexyloxy, 2-hexyloxyethyl, formyloxy, 2-formyloxyethyl, acetoxy, 2-acetoxyethyl, propionoxy, 2-propionoxyethyl, α-ethylbutyroxy, 2-(α-ethylbutyroxy)ethyl, formylamino, acetylamino, propionylamino, α-ethylbutyrylamino and the like.

When Q represents a carbo-lower-alkoxy radical, it represents a radical of the formula COOR' where R' is a lower-alkyl group having from one to about six carbon atoms. Thus the carbo-lower-alkoxy radical includes such radicals as carbomethoxy, carboethoxy, carbopropoxy, carboisopropoxy, carbobutoxy, carbohexoxy and the like.

When Q represents a monocarbocyclic aroyloxy or a monocarbocyclic aroyloxy-lower-alkyl radical, the monocarbocyclic aroyl moiety can be benzoyl or benzoyl substituted by one or more substituents selected from the group consisting of halogen (including fluorine, chlorine, bromine and iodine), lower-alkyl, hydroxy, lower-alkoxy, methylenedioxy, lower-alkylmercapto, lower-alkylsulfinyl, lower-alkylsulfonyl, amino and lower-alkanoylamino. When the monocarbocyclic aroyl moiety is substituted by more than one of the above substituents, the substituents can be the same or different and can occupy any of the available positions on the benzene ring. When the substituent is a lower-alkyl, lower-alkoxy, lower-alkylmercapto, lower-alkylsulfinyl, lower-alkylsulfonyl or lower-alkanoylamino group, said substituents can be either straight or branched and can contain from one to about four carbon atoms. Thus Q also stands, inter alia, for benzoyl, benzoyloxy, 4-fluorobenzoyloxy, 2-chlorobenzoyloxy, 4-bromobenzoyloxy, 4-iodobenzoyloxy, 3-methylbenzoyloxy, 4-isobutylbenzoyloxy, 4-hydroxybenzoyloxy, 4-methoxybenzoyloxy, 4-n-butoxybenzoyloxy, 3,4-methylenedioxybenzoyloxy, 4-methylmercaptobenzoyloxy, 4-isopropylmercaptobenzoyloxy, 4-methylsulfinylbenzoyloxy, 4-isopropylsulfinylbenzoyloxy, 4-methylsulfonylbenzoyloxy, 4-isopropylsulfonylbenzoyloxy, 4-aminobenzoyloxy, 4-acetylaminobenzoyloxy, 3,4-dimethoxybenzoyloxy, 3-chloro-4-methylbenzoyloxy.

When Q represents a carbamyl radical or a carbamyloxy or carbamyloxy-lower-alkyl ester, said carbamyl radical and said carbamyl moiety of said esters can be unsubstituted carbamyl (CONH₂) or N-lower-alkylcarbamyl (CONHR', wherein R' is lower-alkyl) or N,N-di-lower-alkylcarbamyl (CONR'R'', wherein R' and R'' are lower-alkyl). The lower-alkyl radicals in the lower-alkylated carbamyl radicals preferably have from one to about four carbon atoms, can be either straight or branched, and in the di-lower-alkylated carbamyl radicals, the two lower-alkyl radicals can be the same or different. Thus Q also stands, inter alia, for carbamyl, carbamyloxy, 2-carbamyloxyethyl, N - methylcarbamyl, N - methylcarbamyloxy, 2-(N - methylcarbamyloxy)ethyl, N - ethylcarbamyl, N - ethylcarbamyloxy, 2-(N - ethylcarbamyloxy)ethyl, N-isopropylcarbamyl, N - isopropylcarbamyloxy, 2-(N - isopropylcarbamyloxy)ethyl, N-n-butylcarbamyl, N-n-butylcarbamyloxy, 2-(N - n - butylcarbamyloxy)ethyl, N,N-dimethylcarbamyl, N,N - dimethylcarbamyloxy, 2-(N,N-dimethylcarbamyloxy)ethyl, N,N - diethylcarbamyl, N,N-diethylcarbamyloxy, 2-(N,N - diethylcarbamyloxy)ethyl, N,N-dibutylcarbamyl, N,N-dibutylcarbamyloxy, 2-(N,N-dibutylcarbamyloxy)ethyl, N-ethyl - N - methylcarbamyl, N-ethyl - N-methylcarbamyloxy, 2-(N-ethyl-N-methylcarbamyloxy)ethyl and the like.

In the above general Formula I, Alk represents a lower-alkylene radical which contains from one to about five carbon atoms and can be either straight or branched. Thus the group CO-Alk includes such groups, inter alia, as acetyl (COCH₂), β-propionyl (COCH₂CH₂), α-propionyl (COCHCH₃), γ-butyryl (COCH₂CH₂CH₂), α-methyl-β-propionyl (COCHCH₃CH₂), β-butyryl (COCH₂CHCH₃)

δ-valeryl (COCH₂CH₂CH₂CH₂), α - methyl - γ - butyryl (COCHCH₃CH₂CH₂), and the like.

The compounds of the invention are prepared by reacting a halo-lower-alkanoylanilide with an appropriate substituted-piperidine as illustrated by the equation given below where $R_1$, $R_2$, $R_3$, $R_4$, $R_5$, Q and Alk have the meanings given above and Hal represents halogen.

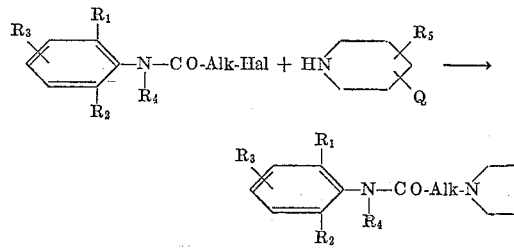

A preferred method comprises heating a substituted-piperidine with a halo-lower-alkanoylanilide at a temperature in the range from about 50° C. to about 150° C. in the presence of an acid-acceptor. The reaction is preferably carried out in an organic solvent, inert under the conditions of the reaction, such as methanol, ethanol, acetonitrile, benzene, xylene and the like. The purpose of the acid-acceptor is to take up the hydrogen halide which is split out during the course of the reaction. The acid-acceptor is a basic substance which forms water-soluble by-products easily separable from the main product of the reaction, and includes such substances as alkali metal salts of weak acids, i.e. sodium carbonate, potassium carbonate, sodium acetate or sodium alkoxides. The acid-acceptor can also be in the form of an excess quantity of the substituted-piperidine.

The compounds of Formula I wherein Q represents a lower-alkoxy or a lower-alkoxy-lower-alkyl radical can be prepared by reacting a lower-alkoxypiperidine or a lower - alkoxy - lower - alkylpiperidine with a halo-lower-alkanoylanilide using the conditions described above for the preparation of compounds of Formula I from a halo-lower-alkanoylanilide and a substituted-piperidine. The lower-alkoxypiperidines and the lower-alkoxy-lower-alkyl-piperidines in turn are prepared by alkylation of a hydroxypiperidine or a hydroxy-lower-alkylpiperidine.

The compounds of Formula I wherein Q is a lower-alkanoyloxy, lower - alkanoyloxy - lower - alkyl, monocarbocyclic aroyloxy or monocarbocyclic aroyloxy-lower-alkyl radical are prepared from the corresponding hydroxypiperidyl-lower-alkanoylanilides or hydroxy-lower-alkylpiperidyl-lower-alkanoylanilides (i.e. compounds of Formula I wherein Q is hydroxy and hydroxy-lower-alkyl, respectively) by reacting the latter with an acylating agent, for example a lower-alkanoyl halide or lower-alkanoic anhydride, or a monocarbocyclic aroyl halide or monocarbocyclic aryl carboxylic anhydride at a temperature in the range from about 20° C. to about 100° C. The reaction can be carried out without the use of a solvent and furthermore can be effected either with or without the use of an acid-acceptor. The acid-acceptor is a basic substance which takes up the lower-alkanoic acid or the monocarbocyclic aryl carboxylic acid which is formed when an acid anhydride is the acylating agent or the hydrogen halide split out when an acid-halide is the acylating agent. Suitable acid-acceptors are alkali metal carbonates, for example sodium carbonate and potassium carbonate or organic tertiary amines, for example triethylamine and pyridine. A preferred acid-acceptor is pyridine, and it is preferred to use as solvent either an excess of pyridine or an excess of a lower-alkanoic anhydride when the latter is the acylating agent.

The compounds of Formula I wherein Q is an unsubstituted carbamyloxy, unsubstituted carbamyloxy-lower-alkyl, N-lower-alkylcarbamyloxy, N-lower-alkylcarbamyloxy-lower-alkyl, N,N-di-lower-alkylcarbamyloxy or N,N-di-lower-alkylcarbamyloxy - lower - alkyl radical are prepared by reacting a hydroxypiperidyl - lower - alkanoylanilide or a hydroxy-lower-alkylpiperidyl-lower-alkanoylanilide with phosgene in the presence of an acid-acceptor at a temperature in the range from about −10° C. to about 25° C. in an organic solvent inert under the conditions of the reaction, for example chloroform, methylene dichloride, ethylene dichloride, toluene, benzene and the like. The acid-acceptor is a basic substance which takes up the hydrogen halide split out during the course of the reaction. Suitable acid-acceptors are organic tertiary amines such as pyridine, triethylamine or N,N-dimethylaniline. A preferred acid-acceptor is N,N-dimethylaniline and preferred solvents are chloroform and toluene.

The resulting chloroformyloxypiperidyl-lower-alkanoylanilides or chloroformyloxy - lower - alkylpiperidyl-lower-alkanoylanilides are then reacted with two molar equivalents of ammonia or a lower-alkyl primary amine or a di-lower-alkyl secondary amine at a temperature in the range from about 0° C. to about 50° C. to give the unsubstituted carbamyloxy-, N-lower-alkylcarbamyloxy- or N,N-di-lower-alkylcarbamyloxy-esters. The second mole of ammonia or amine serves as an acid-acceptor to take up the hydrogen halide which is split out during the reaction.

Alternatively the carbamyloxy esters can be prepared by reacting a hydroxypiperidyl-lower-alkanoylanilide or a hydroxy-lower-alkylpiperidyl-lower-alkanoylanilide with phenyl chloroformate in the presence of an acid-acceptor at a temperature in the range from about −10° C. to about 25° C. The reaction can be carried out either with or without the use of a solvent. Suitable solvents are organic solvents inert under the conditions of the reaction, for example chloroform, methylene dichloride, ethylene dichloride, toluene, benzene and the like. Suitable acid-acceptors are tertiary organic amines such as triethyl amine, N,N-di-methylaniline or pyridine. A preferred acid-acceptor is pyridine and, if desired, an excess of the acid-acceptor can be used as the solvent. The resulting phenoxyformyloxypiperidyl-lower-alkanoylanilides or phenoxyformyloxy - lower - alkylpiperidyl-lower-alkanoylanilides are then reacted with ammonia or a lower-alkyl primary amine or a di-lower-alkyl secondary amine at a temperature in the range from about −25°

C. to about 50° C. to give the unsubstituted carbamyloxy-, N-lower-alkylcarbamyloxy- or N,N-di-lower-alkylcarbamyloxy-esters. The reaction is preferably carried out in an organic solvent inert under the conditions of the reaction, for example ethyl ether, chloroform, methylene dichloride, ethylene dichloride, toluene, benzene and the like.

The compounds of Formula I wherein Q is an unsubstituted carbamyl radical or an N-lower-alkylcarbamyl or N,N-di-lower-alkylcarbamyl radical can be prepared by reacting a halo-lower-alkanoylanilide with an unsubstituted carbamylpiperidine, or an N-lower-alkylcarbamylpiperidine or N,N-di-lower-alkylcarbamyl-piperidine as described above. Alternatively they can be prepared by reacting a carbo-lower-alkoxypiperidyl-lower-alkanoyl-anilide (i.e. compounds of Formula I wherein Q is a carbo-lower-alkoxy radical) with ammonia or a lower-alkyl primary amine or di-lower-alkyl secondary amine in an aqueous or alcoholic medium at a temperature in the range from about 20° C. to about 100° C. If desired, the reaction can be carried out in an autoclave at super-atmospheric pressures up to about 100 pounds p.s.i.

The compounds of my invention are useful in the free base form or in the form of acid-addition or quaternary ammonium salts, and both forms are within the purview of the invention, and in fact, are considered to be one and the same invention. The acid-addition and quaternary ammonium salts are simply a more convenient form for use, and in practice, use of the salt form inherently amounts to use of the base form. As used in the appended claims, unless specifically designated otherwise, reference to compounds having the structure corresponding to Formula I or reference to the terms "hydroxypiperidyl-lower-alkanoylanilide" or "hydroxy-lower-alkylpiperidyl-lower-alkanoyanilide" or esters thereof means both the free base form and the acid-addition and lower-alkyl, lower-alkenyl and monocarbocyclic aryl-lower-alkyl quaternary ammonium salt form of the molecular structure recited. Pharmacologically acceptable salts are salts whose anions are innocuous to the animal organism in effective doses of the salts, so that beneficial physiological properties inherent in the free bases are not vitiated by side-effects ascribable to the anions; in other words, the latter do not substantially affect the pharmacological properties inherent in the cations. Appropriate acid-addition salts are those derived from mineral acids such as hydrochloric acid, hydrobromic acid, hydriodic acid, nitric acid, sulfuric acid, and phosphoric acid; and organic acids such as acetic acid, citric acid, lactic acid, tartaric acid, methanesulfonic acid, benzenesulfonic acid, p-toluenesulfonic acid, sulfamic acid and quinic acid. The quaternary ammonium salts are obtained by the addition of esters of inorganic acids or organic sulfonic acids having a molecular weight less than about 250 to the free base form of the compounds. Preferred esters are those derived from lower-alkyl, lower-alkenyl or monocarbocyclic aryl-lower-alkyl esters of inorganic acids or organic sulfonic acids having a molecular weight less than about 250. The lower-alkyl and lower-alkenyl esters can contain from one to about four carbon atoms, and the moncarbocyclic aryl-lower-alkyl esters can contain from seven to about ten carbon atoms. The esters so used include such compounds, inter alia, as methyl chloride, methyl bromide, methyl iodide, ethyl bromide, propyl chloride, 2-hydroxyethyl bromide, allyl chloride, allyl bromide, methyl sulfate, methyl benzenesulfonate, methyl p-toluenesulfonate, benzyl chloride, benzyl bromide, and substituted benzyl halides, such as p-chlorobenzyl chloride, p-nitrobenzyl chloride, o-chlorobenzyl chloride, p-methoxybenzyl chloride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The quaternary ammonium salts are prepared by mixing the free base and the lower-alkyl, lower-alkenyl or monocarbocyclic aryl-lower-alkyl ester in an organic solvent inert under the conditions of the reaction, for example, ethanol, methanol, ether, acetonitrile and the like. Heating can be used to facilitate the reaction, although salt formation usually takes place readily at room temperature. The quaternary ammonium salt separates directly or can be obtained by concentration of the solution.

Although pharmacologically acceptable salts are preferred, those having toxic anions are also useful. All acid addition salts are useful as intermediates in purification of the free bases, and toxic acid-addition and quaternary ammonium salts are also useful as intermediates in preparing pharmacologically acceptable salts by ion exchange procedures.

The structures of the compounds of the invention have been established by chemical analysis and by the processes for their preparation, which can only lead to compounds of the assigned structures.

The following examples will further illustrate the invention, without the latter being limited thereto. In the examples the symbols $N_B$ and $N_T$ represent basic nitrogen and total nitrogen, respectively.

PREPARATION OF INTERMEDIATES

Example 1

*4-(1-hydroxyethyl)piperidine.*—4 - acetylpyridine (24.2 g., 0.20 mole) was dissolved in a solution of 13.2 g. of acetic acid in 200 ml. of methanol and reduced over 1.0 g. of platinum oxide catalyst under 60 pounds p.s.i. of hydrogen. Reduction was complete in about eight hours. The solution was filtered from the catalyst and the filtrate taken to dryness in vacuo. The residual solid was recrystallized from an isopropanol-ether mixture to give 33.9 g. of 4-(1-hydroxyethyl)-piperidine acetate, M.P. 161–162.5° C. (uncorr.).

A small amount of the acetate salt was redissolved in water and the solution basified with potassium carbonate and extracted with chloroform. The chloroform extracts were dried, taken to dryness and the residue distilled. The crude product boiling at 113–117° C. at 9 mm. was collected and recrystallized from an ethyl acetate-hexane mixture to give 4-(1-hydroxyethyl)piperidine, M.P. 65.0–2° C. (corr.).

*Analysis.*—Calcd. for $C_7H_{15}NO$: C, 65.06; H, 11.70; N, 10.84. Found: C, 64.98; H, 11.40; N, 10.79.

Example 2

*4-(4-hydroxybutyl)piperidine.*—A solution of potassium amide in liquid ammonia was prepared by dissolving 24.6 g. (0.63 mole) of potassium cut into small pieces in 3 liters of liquid ammonia along with about 0.5 g. of ferric chloride. To the resulting solution was added 58.5 g. (0.63 mole) of γ-picoline. The mixture was stirred for ten minutes, treated with 107.5 g. (0.60 mole) of 2-(3-chloropropyloxy)tetrahydropyran, stirred for an additional five hours, treated with about 2 g. of ammonium chloride and allowed to stand at room temperature overnight. The mixture was then treated with 600 ml. of absolute ether, filtered and the filtrate taken to dryness. The residue was distilled in vacuo over potassium carbonate giving 92.9 g. of 2-[4-(4-pyridyl)-1-butyloxy]tetrahydropyran, B.P. 103–108° C./0.03 mm.

*Analysis.*—Calcd. for $C_{14}H_{21}NO_2$: C, 71.45; H, 9.00; N, 5.95. Found: C, 71.20; H, 8.74; N, 5.93.

The 2-[4-(4-pyridyl)-1-butyloxy]tetrahydropyran obtained above (79.4 g., 0.34 mole) was dissolved in a solution of 43 ml. of concentrated hydrochloric acid and 500 ml. of ethanol and the resulting solution was refluxed for about one hour. The solvent was taken off in vacuo, the residue was dissolved in 250 ml. of water, basified with ammonium hydroxide and extracted with methylene dichloride. The extracts were dried, the solvent removed and the residue distilled in vacuo. The fraction boiling between 87.6° C. and 88.6° C. was collected as 4-(4-hydroxybutyl)pyridine; $n_D^{25}=1.5238$. It was converted to the hydrochloride salt and the salt recrystallized from an ethanol-ether mixture giving 9.5 g. of 4-(4-hydroxybutyl)pyridine hydrochloride, M.P. 156.0–157.6° C. (corr.).

Analysis.—Calcd. for $C_9H_{13}NO \cdot HCl$: C, 57.61; H, 7.52; Cl, 18.90. Found: C, 57.42; H, 7.25; Cl, 18.65.

The hydrochloride salt (64.9 g., 0.35 mole) was divided into two approximately equal portions. Each portion was dissolved in 200 ml. of ethanol and reduced separately over 2.0 g. of platinum oxide catalyst under 60 pounds p.s.i. of hydrogen. Reduction in each case was complete in about four hours. The combined mixtures were filtered, evaporated to a volume of about 100 ml. and treated with a solution of 15 g. of sodium hydroxide in 15 ml. of water and then carbonated. The mixture was taken to dryness, extracted with benzene and the benzene extracts taken to dryness once more. The residue was distilled in vacuo, and the fractions collected at 103–104° C. at 0.40 mm. were recrystallized from acetone giving 29.3 g. of 4-(4-hydroxybutyl)piperidine, M.P. 57–60° C. (uncorr.).

Analysis.—Calcd. for $C_9H_{19}NO$: N, 8.91. Found: N, 8.87.

Example 3

4-(5-hydroxypentyl)piperidine was prepared starting with 86.0 g. (0.925 mole) of γ-picoline and 168.4 g. (0.875 mole) of 2-(4-chlorobutoxy)tetrahydropyran using 36.1 g. (0.925 mole) of potassium and 0.1 g. of ferric chloride in 3 liters of liquid ammonia according to the manipulative procedure described above in Example 2. There was thus obtained 160.9 g. of intermediate 2-[5-(4-pyridyl)-1-pentyloxy]tetrahydropyran, B.P. 112° C./0.05 mm.

Analysis.—Calcd for $C_{15}H_{23}NO_2$: C, 72.24; H, 9.30; N, 5.62. Found: C, 72.45; H, 9.45; N, 5.57.

Acid hydrolysis of the tetrahydropyranyl ether with dilute acid according to the manipulative procedure described above in Example 2 gave 81.8 g. of 4-(5-hydroxypentyl)pyridine hydrochloride. The free base was obtained by alkaline hydrolysis of the hydrochloride and distillation. There was thus obtained 4-(5-hydroxy-pentyl)pyridine, B.P. 103–105° C./0.09 mm.

Analysis.—Calcd. for $C_{10}H_{15}NO$: C, 72.68; H, 9.15; N, 8.48. Found: C, 72.48; H, 9.18; N, 8.37.

Reduction of the latter over platinum oxide catalyst according to the manipulative procedure described above in Example 2 afforded 37.9 g. of 4-(5-hydroxypentyl)piperidine hydrochloride.

Analysis.—Calcd. for $C_{10}H_{21}NO \cdot HCl$: C, 57.80; H, 10.68; Cl, 17.06. Found: C, 57.63; H, 10.34; Cl, 17.50.

A small amount of the free base converted to the acetate salt gave 4-(5-hydroxypentyl)piperidine acetate, M.P. 97.6–101.0° C. (corr.).

Analysis.—Calcd. for $C_{10}H_{21}NO_2 \cdot C_2H_4O_2$: C, 62.30; H, 10.89; N, 6.06. Found: C, 62.35; H, 10.68; N, 5.99.

Example 4

4-(6-hydroxyhexyl)piperidine acetate was prepared starting with 83.0 g. (0.89 mole) of γ-picoline and 175.2 g. (0.851 mole) of 2-(5-chloropentyloxy)tetrahydropyran using 35.0 g. (0.89 mole) of potassium and 0.1 g. of ferric chloride in 4.5 liters of liquid ammonia according to the manipulative procedure described above in Example 2. There was thus obtained 222.4 g. of crude product which was distilled in vacuo giving 175.2 g. of 2-[6-(4-pyridyl)-1-hexyloxy]tetrahydropyran, B.P. 120–124° C./.065 mm.

Analysis.—Calcd. for $C_{16}H_{25}NO_2$: C, 72.97; H, 9.57; N, 5.32. Found: C, 72.93; H, 9.53; N, 5.22.

Acid hydrolysis of the tetrahydropyranyl ether (213.2 g., 0.81 mole) with dilute acid according to the manipulative procedure described above in Example 2, and distillation of the product in vacuo gave 98.2 g. of 4-(6-hydroxyhexyl)pyridine, B.P. 111–115° C./0.10 mm.

Analysis.—Calcd. for $C_{11}H_{17}NO$: C, 73.69; H, 9.56; N, 7.81. Found: C, 73.44; H, 9.76; N, 7.74.

Reduction of 71.6 g. (0.40 mole) of the latter over platinum oxide catalyst according to the manipulative procedure described above in Example 2 and recrystallization of the product as the acetate salt from an isopropanol-acetone mixture gave 79.6 g. of 4-(6-hydroxyhexyl)piperidine acetate, M.P. 104.4–107.2° C. (corr.).

Analysis.—Calcd. for $C_{11}H_{23}NO \cdot C_2H_4O_2$: C, 63.63; H, 11.09; N, 5.71. Found: C, 63.94; H, 10.78; N, 5.66.

Example 5

2,4,6-trimethyl-4-hydroxypiperidine hydrobromide.—Into a 500 ml. three-necked flask equipped with a mechanical stirrer, a nitrogen inlet tube, thermometer, dropping funnel and reflux condenser protected with a calcium chloride drying tube were placed 2.92 g. (0.12 mole) of magnesium turnings and 200 ml. of dry ether. After flushing the system with nitrogen, a solution containing 17.03 g. (0.12 mole) of methyliodide in 50 ml. of dry ether was added with stirring over a period of one hour and fifteen minutes. When all the methyliodide had been added, a solution of 6.36 g. (0.05 mole) of 2,6-dimethyl-4-piperidone in 60 ml. of dry ether was added dropwise with stirring over a period of forty-five minutes. The mixture was then refluxed for six hours and allowed to stand at room temperature for twelve hours. A solution of 40 ml. of water and 60 ml. of 10% aqueous ammonium chloride was added dropwise with stirring and external cooling. The aqueous and organic layers were separated, the aqueous layer saturated with potassium carbonate and extracted with methylene dichloride. The combined organic extracts were dried over sodium sulfate and taken to dryness. Two recrystallizations of the residue afforded 2.37 g. of 2,4,6-trimethyl-4-hydroxypiperidine, M.P. 114–116° C. (uncorr.).

Analysis.—Calcd. for $C_8H_{17}NO$: C, 67.05; H, 11.97; N, 9.77. Found: C, 67.21; H, 11.91; N, 9.66.

A small sample converted to the hydrobromide and recrystallized from an isopropyl acetate-ether mixture gave 2,4,6-trimethyl-4-hydroxypiperidine hydrobromide, M.P. 233.2–235.0° C. (corr.).

Analysis.—Calcd. for $C_8H_{17}NO \cdot HBr$: C, 42.94; H, 8.10; Br, 35.77. Found: C, 43.02; H, 8.05; Br, 36.00.

Example 6

2,2,4,6,6-pentamethyl-4-hydroxypiperidine was prepared from 15.5 g. (0.10 mole) of 2,2,6,6-tetramethyl-4-piperidone and 34.1 g. (0.24 mole) of methyl iodide using 5.84 g. (0.24 mole) of magnesium turnings according to the manipulative procedure described above in Example 5. The product was isolated as the free base and recrystallized from hexane to give 12.1 g. of 2,2,4,6,6-pentamethyl-4-hydroxypiperidine, M.P. 72.6–77.0° C. (corr.).

Analysis.—Calcd. for $C_{10}H_{21}NO$: C, 70.10; H, 12.38; N, 8.17. Found: C, 69.78; H, 12.70; N, 8.10.

Example 7

4-(N-methylcarbamyl)piperidine hydrochloride.—4-(N-methylcarbamyl)pyridine (54.4 g., 0.4 mole) was dissolved in a solution containing 26.4 g. of glacial acetic acid in 400 ml. of water. The solution was divided into two equal portions, and each portion was reduced over 1.0 g. of platinum oxide catalyst under 60 pounds p.s.i. Reduction in each case was complete in about six hours. The mixtures were filtered from the catalyst, the filtrates from each run combined and concentrated to a volume of about 150 ml. To the solution was added 40 ml. of concentrated hydrochloric acid and the solution taken to dryness once more. The crude residue was recrystallized from an ethanol-ether mixture giving 68 g. of 4-(N-methylcarbamyl)piperidine hydrochloride, M.P. 200.2–203.0° C. (corr.).

*Analysis.*—Calcd. for $C_8H_{16}N_2O$: C, 61.49; H, 10.32; $N_B$, 8.97. Found: C, 61.31; H, 10.20; $N_B$ 8.98.

Example 8

*4-(N,N-dimethylcarbamyl)piperidine.*—To a cold solution (—10° C.) containing 24.6 g. (0.20 mole) of isonicotinic acid and 20.5 g. (0.20 mole) of triethylamine in 500 ml. of acetone was added 23.9 g. (0.22 mole) of ethyl chlorocarbonate. The solution was stirred at —10 to —15° C. for twenty minutes and then treated with a solution containing 13.5 g. (0.30 mole) of dimethylamine in acetone. The mixture was stirred at room temperature for two and a half hours and then filtered. The filtrate was taken to dryness and the residue taken into benzene and washed with a saturated potassium carbonate solution. The organic layer was dried, evaporated and distilled in vacuo. The sample boiling at around 113° C./1.5 mm. was collected and recrystallized once from ethyl acetate and once from a benzenehexane mixture giving 3.5 g. of 4-(N,N-dimethylcarbamyl)pyridine, M.P. 57.4–60.6° C. (corr.).

*Analysis.*—Calcd. for $C_8H_{10}N_2O$: C, 63.96; H, 6.71; N, 18.65. Found: C, 63.86; H, 6.89; N, 18.53.

4-(N,N-dimethylcarbamyl)pyridine (77.7 g., 0.52 mole) dissolved in a solution containing 34 g. of glacial acetic acid in 600 ml. of water was reduced in three portions over 1.0 g. of platinum oxide under 60 pounds p.s.i. of hydrogen according to the manipulative procedure described above in Example 7. The product was isolated as the free base and recrystallized once from an ethyl-acetate-hexane mixture and once from hexane alone giving 50.3 g. of 4-(N,N-dimethylcarbamyl)piperidine, M.P. 64.2–68.2° C. (corr.).

*Analysis.*—Calcd. for $C_8H_{16}N_2O$: C, 61.49; H, 10.32; $N_B$, 8.97. Found: C, 61.31; H, 10.20; $N_B$, 8.98.

Example 9

4-(N-ethylcarbamyl)piperidine hydrochloride was prepared from 45 g. (0.3 mole) of 4-(N-ethylcarbamyl)-pyridine according to the manipulative procedure described above in Example 7. The product was isolated as the free base and recrystallized once from ethyl acetate and once from acetone to give 23.9 g. of 4-(N-ethylcarbamyl)piperidine, M.P. 98–102° C. (uncorr.).

A small amount of the free base was converted to the hydrochloride and recrystallized from an ethanol-ether mixture to give 4-(N-ethylcarbamyl)piperidine hydrochloride, M.P. 162.0–164.8° C. (corr.).

*Analysis.*—Calcd. for $C_8H_{16}N_2O \cdot CHl$: C, 49.86; H, 8.89; O, 8.30. Found: C, 49.93; H, 8.95; O, 8.90.

Example 10

*4-(N,N-diethylcarbamyl)piperidine* was prepared from 35.6 g. (0.20 mole) of 4-(N,N-diethylcarbamyl)pyridine according to the manipulative procedure described above in Example 7. The product was purified by distillation to give 15.8 g. of 4-(N,N-diethylcarbamyl)piperidine, B.P. 87.5–88.5° C./0.21 mm.

*Analysis.*—Calcd. for $C_{10}H_{20}N_2O$: C, 65.16; H, 10.94; $N_B$, 7.60. Found: C, 65.31; H, 10.88; $N_B$, 7.66.

Example 11

*3-acetamidopiperidine nitrate.*—Forty grams (0.29 mole) of 3-acetamidopyridine were dissolved in a solution containing 270 ml. of ethanol, 50 ml. of water and 46 ml. of 6.4 N-HCl and reduced over 4.0 g. of platinum oxide under about 60 pounds p.s.i. of hydrogen. When reduction was complete, the catalyst was removed by filtration and the filtrate taken to dryness in vacuo. The last traces of water were removed by azeotropic distillation with benzene and ethanol. The residue was redissolved in absolute ethanol and the solution added to a solution of 16.8 g. of potassium hydroxide in ethanol. The mixture was diluted with about three volumes of absolute ether, and the potassium chloride that separated was filtered off. The filtrate was taken to dryness and the residual oil was distilled in vacuo giving 34.7 g. of material of B.P. 110–126° C./0.65–0.85 mm. which solidified on standing. The solid was recrystallized from ethyl acetate giving 3-acetamidopiperidine, M.P. 72–82° C. (uncorr.).

A sample of the free base (9.7 g.) was converted to the nitrate salt and recrystallized from methanol giving 13.4 g. of 3-acetamidopiperidine, M.P. 176.8–180.4° C. (corr.).

*Analysis.*—Calcd. for $C_7H_{14}N_2O \cdot HNO_3$: C, 40.97; H, 7.37; N, 20.48. Found: C, 41.13; H, 7.56; N, 20.78.

Example 12

*d,l-3-acetamido-2,6-dimethylpiperidine hydrochloride.*—3-acetamido-2,6-dimethylpyridine hydrochloride (12.4 g., 0.062 mole) dissolved in 90 ml. of glacial acetic acid was reduced over a platinum oxide catalyst under 1700 pounds p.s.i. of hydrogen and at a temperature of 151° C. Reduction was complete in four and a half hours. The catalyst was removed by filtration and the filtrate taken to dryness in vacuo. The residue was treated with saturated aqueous potassium carbonate and extracted with chloroform. The organic extracts on drying and evaporation yielded a red-brown oil which was distilled in vacuo. There was thus obtained 5.5 g. of d,l-3-acetamido-2,6-dimethylpiperidine, B.P. 98–102° C./0.15 mm.

The free base was converted to the hydrochloride salt and recrystallized from isopropyl alcohol giving 4.2 g. of d,l - 3 - acetamido-2,6-dimethylpiperidine hydrochloride, M.P. 269.2–272.6° C. (corr.).

*Analysis.*—Calcd. for $C_9H_{18}N_2O \cdot HCl$: Cl, 17.15; N, 13.55. Found: Cl, 17.10; N, 13.46.

Example 13

*4-acetamidopiperidine.*—4-acetamidopyridine (34.5 g., 0.2 mole) was dissolved in 200 ml. of glacial acetic acid and reduced over 1.5 g. of platinum oxide under a hydrogen pressure of 60 pounds p.s.i. and a temperature of around 60° C. Reduction was complete in about twenty-four hours. The catalyst was removed by filtration and the filtrate taken to dryness in vacuo. The residual glass was dissolved in ethanol, treated with a solution of 0.19 mole of sodium ethoxide in 100 ml. of ethanol (prepared by dissolving 4.3 g. of sodium in ethanol). The precipitated sodium chloride was filtered off and the filtrate taken to dryness. The residue was extracted with chloroform, the extracts were filtered, taken to dryness once more and the residue recrystallized from a benzene-hexane mixture giving 24 g. of 4-acetamidopiperidine, M.P. 137.8–141.0° C. (corr.).

*Analysis.*—Calcd. for $C_7H_{14}N_2O$: $N_T$, 19.71; $N_B$, 9.85. Found: $N_T$, 19.61; $N_B$, 10.08.

PREPARATION OF FINAL PRODUCTS

Example 14

α - [1 - (3-hydroxypiperidyl)]-2,6-dimethylacetanilide [I; $R_1$ and $R_2$ are $CH_3$, $R_3$, $R_4$ and $R_5$ are H, Q is 3-HO, Alk is $CH_2$].—A mixture of 14.8 g. (0.075 mole) of α-chloro-2,6-dimethylacetanilide, 8.1 g. (0.08 mole) of 3-hydroxypiperidine, 16.0 g. (0.15 mole) of anhydrous sodium carbonate and 150 ml. of absolute ethanol was refluxed for eighteen hours, filtered and the filter washed with absolute ethanol. The combined filtrate was taken to dryness leaving 23.1 g. of solid. The solid was suspended in benzene, extracted five times with dilute hydrochloric acid and the combined acid extracts basified with solid potassium carbonate. The basic mixture was then extracted with chloroform, and the organic extracts were dried over anhydrous sodium sulfate and taken to dryness. The residual solid (18.4 g.) on recrystallization once from benzene and twice from acetone gave 14.0 g. of α - [1 - (3 - hydroxypiperidyl)]-2,6-dimethylacetanilide, M.P. 131.0–145.6° C. (corr.).

*Analysis.*—Calcd. for $C_{15}H_{22}N_2O_2$: $N_B$, 5.34; $N_T$, 10.68. Found: $N_B$, 5.17; $N_T$, 10.56.

α - [1 - (3 - hydroxypiperidyl)]-2,6-dimethylacetanilide can be reacted with hydrochloric acid, hydrobromic acid, hydriodic acid, nitric acid, sulfuric acid, phosphoric acid, acetic acid, citric acid, lactic acid, tartaric acid, methyl chloride, methyl bromide, methyl iodide, ethyl bromide, allyl bromide, methyl sulfate, methyl-p-toluenesulfonate, benzyl chloride or o-chlorobenzyl chloride to give the hydrochloride, hydrobromide, hydriodide, nitrate, sulfate (or bisulfate), phosphate (or acid phosphate), acetate, citrate (or acid citrate), lactate, tartrate (or bitartrate), methochloride, methobromide, methiodide, ethobromide, allobromide, methosulfate, metho p-toluenesulfonate, benzochloride or 2-chlorobenzochloride salts, respectively.

α-[1-(3-hydroxypiperidyl)]-2,6-dimethylacetanilide in the form of its hydrofluoride salt can be converted to the hydrochloride salt by passing an aqueous solution of the former over an ion-exchange resin saturated with chloride ions, for example, Rohm and Haas' Amberlite® IRA-400 resin.

α - [1 - (3-hydroxypiperidyl)]-2,6-dimethylacetanilide can be reacted with arsenic acid to give α-[1-(3-hydroxypiperidyl)]-2,6-dimethylacetanilide arsenate.

Example 15

α - [1 - (2,6 - dimethyl-4-hydroxypiperidyl)]-2,6-dimethylacetanilide [I; $R_1$ and $R_2$ are $CH_3$; $R_3$ and $R_4$ are H, $R_5$ is 2,6-di-$CH_3$, Q is 4-OH, Alk is $CH_2$].—A mixture of 4.8 g. (0.02 mole) of α-bromo-2,6-dimethylacetanilide and 5.4 g. (0.04 mole) of 2,6-dimethyl-4-hydroxypiperidine in 100 ml. of acetonitrile was refluxed for six hours then diluted with ether and filtered. The filtrate was taken to dryness and the residue suspended in benzene and extracted with dilute acid. The acid extracts were basified and the resulting precipitate collected and recrystallized from an ethyl acetate-hexane mixture giving 3.9 g. of α-[1-(2,6-dimethyl-4-hydroxypiperidyl)]-2,6-dimethylacetanilide, M.P. 149.8–151.6° C. (corr.).

*Analysis.*—Calcd. for $C_{17}H_{26}N_2O_2$: C, 70.31; H, 9.03; N, 9.65. Found: C, 69.91; H, 8.96; N, 9.64.

Examples 16–59

By following one of the manipulative procedures described above in Examples 14 and 15, substituting for the reactants used therein an appropriate halo-loweralkanoylanilide and an appropriate substituted-piperidine, there were obtained the compounds of Formula I listed below in Table I, where $R_1$ and $R_2$ in each example is $CH_3$ and $R_4$ in each example is hydrogen. The melting points are uncorrected unless noted otherwise, and the numerals preceding the functional groups in the columns headed $R_3$, $R_5$ and Q designate the position of the group on the phenyl ring or the piperidine ring as the case may be.

TABLE 1

| Ex. | $R_3/R_5$ | Q/Alk | M.P. (° C.) | Analysis Calcd. | Analysis Found |
|---|---|---|---|---|---|
| 16 | H / H | 4-OH / $CH_2$ | 127.4–129.6 | N, 10.68; O, 12.20 | N, 10.56; O, 12.18 |
| 17 | H / H | 2-$CH_2$OH / $CH_2$ | 109.6–111.6 | $N_B$, 5.07; $N_T$, 10.14 | $N_B$, 5.08; $N_T$, 10.18 |
| 18[1] | H / H | 4-CHOHCH$_3$ / $CH_2$ | 215.2–218.0 | N, 8.57; Cl, 10.85 | N, 8.62; Cl, 19.78 |
| 19[1] | H / H | 4-$CH_2CH_2$OH / $CH_2$ | 193.8–196.0 | C, 62.46; H, 8.33; N, 8.57 | C, 62.56; H, 8.05; N, 8.55 |
| 20 | H / H | 4-$(CH_2)_4$OH / $CH_2$ | 101.0–102.8 | C, 71.65; H, 9.50; N, 8.80 | C, 71.65; H, 9.35; N, 8.80 |
| 21 | H / H | 4-$(CH_2)_5$OH / $CH_2$ | 80.0–83.6 | C, 72.25; H, 9.70; N, 8.42 | C, 72.31; H, 9.70; N, 8.38 |
| 22 | H / H | 4-$(CH_2)_6$OH / $CH_2$ | 69.2–71.0 | C, 72.70; H, 9.89; N, 8.08 | C, 72.52; H, 10.00; N, 7.92 |
| 23 | H / H | 4-$(CH_2)_3$OH / $CH_2CH_2$ | 113.4–115.4 | C, 71.65; H, 9.49; $N_T$, 8.80 | C, 71.70; H, 9.29; $N_T$, 8.76 |
| 24 | H / H | 4-$(CH_2)_4$OH / $CH_2CH_2$ | 91.8–93.2 | C, 72.25; H, 9.71; N, 8.42 | C, 72.54; H, 9.97; N, 8.65 |
| 25 | H / H | 4-$(CH_2)_5$OH / $CH_2CH_2$ | 114.6–116.4 | C, 72.70; H, 9.89; N, 8.08 | C, 72.70; H, 9.71; N, 7.99 |
| 26 | H / H | 4-$(CH_2)_6$OH / $CH_2CH_2$ | 110.0–111.0 | C, 73.24; H, 10.07; N, 7.77 | C, 73.28; H, 10.11; N, 7.69 |
| 27 | H / H | 4-$(CH_2)_3$OH / CHCH$_3$ | 93.2–96.2 | C, 71.58; H, 9.50; N, 8.80 | C, 71.59; H, 9.25; N, 8.70 |
| 28 | H / H | 4-$(CH_2)_4$OH / CHCH$_3$ | 72.8–75.2 | C, 72.25; H, 9.71; N, 8.42 | C, 72.07; H, 9.87; N, 8.14 |
| 29 | H / H | 4-$(CH_2)_5$OH / CHCH$_3$ | 62.2–66.4 | C, 72.70; H, 9.89; N, 8.08 | C, 72.73; H, 10.11; N, 8.00 |
| 30 | H / H | 4-$(CH_2)_6$OH / CHCH$_3$ | 80.2–84.4 | C, 73.24; H, 10.07; N, 7.77 | C, 73.50; H, 9.89; N, 7.87 |
| 31 | H / 2,4,6-tri-CH$_3$ | 4-OH / $CH_2$ | 146.0–149.0 | C, 71.00; H, 9.27; N, 9.27 | C, 71.35; H, 9.16; N, 9.08 |
| 32 | H / 2,2,6,6-tetra-CH$_3$ | 4-OH / $CH_2$ | 198.2–200.2 | C, 71.65; H, 9.49; N, 8.80 | C, 71.56; H, 9.39; N, 8.73 |
| 33 | H / 2,2,4,6,6-penta-CH$_3$ | 4-OH / $CH_2$ | 210.8–213.0 | C, 72.20; H, 9.70; N, 8.42 | C, 72.32; H, 9.79; N, 8.31 |
| 34[2] | CH$_3$ / H | 4-$(CH_2)_3$OH / $CH_2$ | 75.0–79.0 | C, 67.80; H, 9.59; N, 8.32 | C, 68.55; H, 9.44; N, 9.00 |
| 35 | CH$_3$ / H | 4-$(CH_2)_4$OH / $CH_2$ | 81.0–82.2 | C, 72.25; H, 9.71; N, 8.42 | C, 72.27; H, 10.05; N, 8.34 |
| 36 | CH$_3$ / H | 4-$(CH_2)_5$OH / $CH_2$ | 124.6–126.2 | C, 72.70; H, 8.89; N, 8.08 | C, 72.85; H, 9.69; N, 7.77 |
| 37 | CH$_3$ / H | 4-$(CH_2)_6$OH / $CH_2$ | 94.0–96.2 | C, 73.24; H, 10.07; N, 7.77 | C, 73.00; H, 10.10; N, 7.67 |
| 38 | CH$_3$ / H | 4-$(CH_2)_4$OH / $CH_2CH_2$ | 75.4–80.4 | C, 72.70; H, 9.89; N, 8.08 | C, 72.91; H, 9.87; N, 8.02 |
| 39 | CH$_3$ / H | 4-$(CH_2)_5$OH / $CH_2CH_2$ | 92.0–93.8 | C, 73.24; H, 10.07; N, 7.77 | C, 73.34; H, 10.37; N, 7.64 |

See footnote at end of table.

TABLE 1—Continued

| Ex. | $R_3/R_5$ | Q/Alk | M.P. (° C.) | Analysis Calcd. | Analysis Found |
|---|---|---|---|---|---|
| 40 | CH$_3$ / H | 4-(CH$_2$)$_6$OH / CH$_2$CH$_2$ | 100.8–102.0 | C, 73.78; H, 10.23; N, 7.48 | C, 73.64; H, 10.43; N, 7.41 |
| 41 | CH$_3$ / H | 4-(CH$_2$)$_4$OH / CHCH$_3$ | 109.4–111.6 | C, 72.70; H, 9.89; N, 8.08 | C, 72.85; H, 9.81; N, 8.09 |
| 42 | CH$_3$ / H | 4-(CH$_2$)$_5$OH / CHCH$_3$ | 93.0–95.2 | C, 73.24; H, 10.07; N, 7.77 | C, 73.17; H, 10.39; N, 7.74 |
| 43 | CH$_3$ / H | 4-(CH$_2$)$_6$OH / CHCH$_3$ | 84.4–86.2 | N$_T$, 7.48; N$_B$, 3.74 | N$_T$, 7.35; N$_B$, 3.69 |
| 44 | CH$_3$ / 2,6-di-CH$_3$ | 4-OH / CH$_2$ | 181.6–183.8 | C, 71.02; H, 9.27; N, 9.20 | C, 71.31; H, 9.21; N, 9.03 |
| 45 | H / H | 2-COOC$_2$H$_5$ / CH$_2$ | 73.8–75.2 | N$_T$, 8.80; N$_B$, 4.40 | N$_T$, 8.86; N$_B$, 4.37 |
| 46 | H / H | 4-COOC$_2$H$_5$ / CH$_2$ | 85.2–87.4 | N, 8.80; O, 15.08 | N, 8.51; O, 15.28 |
| 47 | H / H | 3-CONH$_2$ / CH$_2$ | 155.4–157.4 | N$_T$, 14.52; N$_B$, 4.84 | N$_T$, 14.62; N$_B$, 4.78 |
| 48 | H / H | 4-CONH$_2$ / CH$_2$ | 190.4–192.4 | N$_T$, 14.52; N$_B$, 4.84 | N$_T$, 14.58; N$_B$, 4.79 |
| 49 | H / H | 4-CONHCH$_3$ / CH$_2$ | 217.8–220.6 | N$_T$, 13.85; N$_B$, 4.62 | N$_T$, 13.89; N$_B$, 4.70 |
| 50 | H / H | 4-CON(CH$_3$)$_2$ / CH$_2$ | 135.6–139.0 | N$_T$, 13.23; N$_B$, 4.41 | N$_T$, 13.17; N$_B$, 4.42 |
| 51 | H / H | 4-CONHC$_2$H$_5$ / CH$_2$ | 189.4–190.6 | N$_T$, 13.24; N$_B$, 4.41 | N$_T$, 13.30; N$_B$, 4.47 |
| 52 | H / H | 4-CON(C$_2$H$_5$)$_2$ / CH$_2$ | 112.6–115.2 | C, 69.53; H, 9.04; N, 12.16 | C, 69.59; H, 9.11; N, 12.05 |
| 53 | H / H | 4-CONH$_2$ / CH$_2$CH$_2$ | 226.8–229.8 | N, 13.86; O, 10.54 | N, 13.77; O, 10.65 |
| 54 | H / H | 4-CONHCH$_3$ / CH$_2$CH$_2$ | 219.6–222.2 | N$_T$, 13.24; N$_B$, 4.41 | N$_T$, 13.30; N$_B$, 4.48 |
| 55 | H / H | 4-CON(CH$_3$)$_2$ / CH$_2$CH$_2$ | 141.4–144.0 | C, 68.87; H, 8.82; N, 12.69 | C, 68.65; H, 9.00; N, 12.59 |
| 56 | H / H | 4-CONHC$_2$H$_5$ / CH$_2$CH$_2$ | 217.6–218.6 | N$_T$, 12.68; N$_B$, 4.23 | N$_T$, 12.61; N$_B$, 4.30 |
| 57 | H / H | 4-CON(C$_2$H$_5$)$_2$ / CH$_2$CH$_2$ | 107.4–109.2 | C, 70.17; H, 9.25; N, 11.69 | C, 69.95; H, 9.13; N, 11.55 |
| 58 | CH$_3$ / H | 4-CON(C$_2$H$_5$)$_2$ / CH$_2$ | 73.8–75.4 | C, 70.13; H, 9.25; N, 11.69 | C, 70.16; H, 9.42; N, 11.60 |
| 59 | H / H | 3-NHCOCH$_3$ / CH$_2$ | 185.4–188.6 | N$_T$, 13.86; N$_B$, 4.62 | N$_T$, 13.77; N$_B$, 4.71 |

1 Hydrochloride salt.   2 Monohydrate.

Example 60

α-{1-[2-(N-methylcarbamyl)piperidyl]}-2,6-dimethylacetanilide [I; R$_1$ and R$_2$ are CH$_3$, R$_3$, R$_4$ and R$_5$ are H, Q is 2-CONHCH$_3$, Alk is CH$_2$].—By reacting the α-[1-(2-carbethoxypiperidyl)]-2,6-dimethylacetanilide prepared above in Example 45 with methylamine in an ethanol solution in an autoclave at a temperature around 100° C., there can be obtained α-{1-[2-(N-methylcarbamyl)piperidyl]}-2,6-dimethylacetanilide.

Examples 61–94

By following one of the manipulative procedures described above in Examples 14 and 15, substituting for the reactants used therein an appropriate substituted-piperidine and an appropriate halo-lower-alkanoylanilide, there can be obtained the compounds of Formula I listed below in Table 2.

TABLE 2

| Ex. | R$_1$ | R$_2$/R$_3$ | R$_4$/R$_5$ | Q/Alk |
|---|---|---|---|---|
| 61 | CH$_3$ | CH$_3$ / H | CH$_3$ / H | 4-CH$_2$OH / CH$_2$ |
| 62 | CH$_3$ | CH$_3$ / H | C$_2$H$_5$ / H | 2-CH$_2$CH$_2$OH / (CH$_2$)$_3$ |
| 63 | CH$_3$ | CH$_3$ / H | CH$_3$CH$_2$CH$_2$ / H | 2-CH$_2$CHOHCH$_3$ / CH(CH$_3$)CH$_2$ |
| 64 | CH$_3$ | CH$_3$ / H | n-C$_4$H$_9$ / H | 2-(CH$_2$)$_3$OH / CH$_2$CH(CH$_3$) |
| 65 | CH$_3$ | CH$_3$ / 4-(CH$_3$)$_3$C | 2-CH$_3$ / H | 6-CH$_2$CH$_2$OH / CH$_2$CH$_2$ |
| 66 | CH$_3$ | (CH$_3$)$_3$C / 4-CH$_3$ | 2-CH$_3$ / H | 4-OH / (CH$_2$)$_3$ |
| 67 | CH$_3$ | CH$_3$ / H | 2,2,4,6-tetra-CH$_3$ | 4-OH / CH$_2$ |
| 68 | CH$_3$ | CH$_3$ / 4-CH$_3$ | 2,2,6-tri-CH$_3$ / H | 4-OH / CH$_2$ |
| 69 | CH$_3$ | C$_2$H$_5$ / 4-CH$_3$ | 2,2-di-CH$_3$-6-(CH$_3$)$_2$CHCH$_2$ / H | 4-OH / CH$_2$ |
| 70 | CH$_3$ | (CH$_3$)$_3$C / 4-CH$_3$ | 2,2,6,6-tetra-CH$_3$-4-C$_2$H$_5$ / H | 4-OH / CH$_2$ |
| 71 | CH$_3$ | CH$_3$ / 4-(CH$_3$)$_3$C | 2,5-di-CH$_3$-4-C$_2$H$_5$ / H | 2-CH$_2$CH$_2$OH / (CH$_2$)$_3$ |
| 72 | CH$_3$ | CH$_3$ / 4-CH$_3$ | 5-C$_2$H$_5$ / H | 4-CH$_2$CH$_2$OH / (CH$_2$)$_2$ |
| 73 | CH$_3$ | C$_2$H$_5$ / 4-CH$_3$ | 3-C$_2$H$_5$ / H | 4-CH$_2$CH$_2$OH / CH$_2$ |
| 74 | CH$_3$ | CH$_3$ / 4-(CH$_3$)$_2$CH | C$_2$H$_5$ / 2,5-di-CH$_3$ | 4-COOCH$_3$ / CH$_2$ |
| 75 | CH$_3$ | CH$_3$ / 3-CH$_3$ | H / H | 4-COOCH$_3$ / (CH$_2$)$_4$ |

TABLE 2—Continued

| Ex. | $R_1$ | $R_2/R_3$ | $R_4/R_5$ | Q/Alk |
|---|---|---|---|---|
| 76 | $CH_3$ | $C_2H_5$ / 4-$CH_3$ | H / H | 4-COO$C_3H_7$(n) / CH($CH_3$)$CH_2CH_2$ |
| 77 | $CH_3$ | ($CH_3$)$_2$CH / H | H / H | 4-COO$C_3H_7$(iso) / ($CH_2$)$_5$ |
| 78 | $C_2H_5$ | $C_2H_5$ / 4-$CH_3$ | H / H | 4-COO$C_6H_{13}$(n) / $CH_2$ |
| 79 | $CH_3$ | $CH_3$ / H | H / H | 3-NHCHO / CHCH$_3$ |
| 80 | $CH_3$ | $C_2H_5$ / 4-$CH_3$ | $CH_3$ / H | 3-NHCO$CH_2CH_3$ / $CH_2CH_2$ |
| 81 | $CH_3$ | ($CH_3$)$_3$C / 4-$CH_3$ | H / H | 3-NHCOCH($C_2H_5$)$_2$ / $CH_2$ |
| 82 | $CH_3$ | $CH_3$ / 4-($CH_3$)$_3$C | $C_2H_5$ / 2,2,6-tri-$CH_3$ | 4-NHCO$CH_3$ / ($CH_2$)$_3$ |
| 83 | $CH_3$ | $CH_3$ / 4-$CH_3$ | H / 2,6-di-$CH_3$ | 3-NHCO$CH_3$ / $CH_2$ |
| 84 | $CH_3$ | $CH_3$ / 4-$CH_3$ | H / H | 4-NHCO$CH_3$ / $CH_2$ |
| 85 | $CH_3$ | $CH_3$ / 4-($CH_3$)$_3$C | H / H | 2-CONHCH($CH_3$)$_2$ / $CH_2$ |
| 86 | $CH_3$ | ($CH_3$)$_3$C / 4-$CH_3$ | H / H | 3-CONH$C_4H_9$(n) / ($CH_2$)$_2$ |
| 87 | $C_2H_5$ | $C_2H_5$ / 4-$CH_3$ | $CH_3$ / H | 4-CON($C_4H_9$)$_2$(n) / CHCH$_3$ |
| 88 | $CH_3$ | $C_2H_5$ / 4-$CH_3$ | $C_2H_5$ / H | 4-CON($C_2H_5$)($CH_3$) / ($CH_2$)$_3$ |
| 89 | $CH_3$ | $CH_3$ / H | H / 2-$CH_3$ | 6-$CH_3$O$CH_2CH_2$ / $CH_2$ |
| 90 | $CH_3$ | $CH_3$ / 4-$CH_3$ | $CH_3$ / 2,6-di-$CH_3$ | 4-$CH_3$O / $CH_2CH_2$ |
| 91 | $CH_3$ | $CH_3$ / 3-$CH_3$ | $C_2H_5$ / 2-$CH_3$ | 6-($CH_3$)$_2$CHO$CH_2CH_2$ / ($CH_2$)$_3$ |
| 92 | $C_2H_5$ | $C_2H_5$ / 4-$CH_3$ | $CH_3CH_2CH_2$ / 2,6-di-$CH_3$ | 4-($CH_3$)$_2$CHO / CHCH$_3$ |
| 93 | $CH_3$ | ($CH_3$)$_2$CH / 4-$CH_3$ | n-$C_4H_9$ / 2-$CH_3$ | 6-$CH_3$($CH_2$)$_5$O$CH_2CH_2$ / CH($CH_3$)$CH_2$ |
| 94 | $CH_3$ | $CH_3$ / 4-($CH_3$)$_3$C | H / 2,6-di-$CH_3$ | 4-$CH_3$($CH_2$)$_5$O / $CH_2$ |

*Example 95*

α-[1-(3-acetoxypiperidyl)]-2,6-dimethylacetanilide [I; $R_1$ and $R_2$ are $CH_3$, $R_3$, $R_4$ and $R_5$ are H, Q is 3-OCOCH$_3$, Alk is $CH_2$].—A mixture of 4.0 g. (0.015 mole) of α-[1-(3-hydroxypiperidyl)]-2,6-dimethylacetanilide and 25 ml. of acetic anhydride was heated on a steam bath for six hours and the excess acetic anhydride then removed in vacuo. The residue was taken into benzene, extracted with dilute hydrochloric acid, the acid extracts basified with solid potassium carbonate and the alkaline mixture extracted with chloroform. The extracts were taken to dryness and the residual solid recrystallized once from ethyl acetate and once from a benzenehexane mixture giving 1.62 g. of α-[1-(3-acetoxypiperidyl)]-2,6-dimethylacetanilide, M.P. 132.4–133.8° C. (corr.).

*Analysis.*—Calcd. for $C_{17}H_{24}N_2O_3$: $N_T$, 9.20; $N_B$, 4.60. Found: $N_T$, 9.25; $N_B$, 4.61.

*Example 96*

α-[1-(3-benzoyloxypiperidyl)]-2,6-dimethylacetanilide (I; $R_1$ and $R_2$ are $CH_3$, $R_3$, $R_4$ and $R_5$ are H, Q is 3-OCOC$_6H_5$, Alk is $CH_2$].—Four grams (0.015 mole) of α-[1-(3-hydroxypiperidyl)]-2,6-dimethylacetanilide and 2.6 g. (0.018 mole) of benzoyl chloride were dissolved in 25 ml. of pyridine. The solution was allowed to stand at room temperature for twenty hours and then heated on a steam bath for an hour and a half. The pyridine was removed in vacuo and the residue taken into dilute acetic acid, charcoaled, filtered and basified with solid potassium carbonate. The mixture was extracted with chloroform, the extracts were dried and taken to dryness leaving a gum which was recrystallized once from hexane and once from an ethyl acetate-hexane mixture giving 2.44 g. of α-[1-(3-benzoyloxypiperidyl)]-2,6-dimethylacetanilide, M.P. 87.4–89.2° C. (corr.).

*Analysis.*—Calcd. for $C_{22}H_{26}N_2O_3$: N, 7.65; O, 13.09. Found: N, 7.59; O, 12.80.

*Examples 97–100*

By following one of the manipulative procedures described above in Examples 95 and 96, substituting for the reactants used therein an appropriate 1-(hydroxypiperidyl)-lower-alkanoylanilide and an appropriate lower-alkanoyl halide, lower-alkanoic anhydride, monacarbocyclic aroyl halide or monocarbocyclic aryl carboxylic anhydride, there were obtained the compounds of formula I listed below in Table 3 where $R_1$ and $R_2$ in each example is $CH_3$ and $R_3$, $R_4$ and $R_5$ in each example is hydrogen.

TABLE 3

| Ex. | Q | Alk | M.P.(° C.) | Analysis Calcd. | Analysis Found |
|---|---|---|---|---|---|
| 97 | 4-OCOCH$_3$ | $CH_2$ | 113.6–116.2 | $N_T$, 9.20; $N_B$, 4.51 | $N_T$, 8.99; $N_B$, 4.59 |
| 98 | 4-OCOCH$_2$CH$_3$ | $CH_2$ | 68.0–70.0 | $N_T$, 8.80; $N_B$, 4.40 | $N_T$, 8.81; $N_B$, 4.38 |
| 99 | 4-OCOCH($C_2O_5$)$_2$ | $CH_2$ | 96.8–99.6 | C, 69.96; H, 8.95; N, 7.77 | C, 69.90; H, 8.90; N, 7.68 |
| 100 | 4-OCOC$_6H_5$ | $CH_2$ | 106.4–108.2 | N, 7.65; O, 13.10 | N, 7.58; O, 12.85 |

*Examples 101–123*

By following one of the manipulative procedures described above in Examples 95 and 96, substituting for the reactants used therein an appropriate 1-(hydroxy- or hydroxy-lower-alkylpiperidyl)-lower-alkanoylanilide and an appropriate lower-alkanoyl halide, lower-alkanoic anhydride, monocarbocyclic aroyl halide or monocarbocyclic aryl carboxylic anyhydride, there can be obtained the compounds of formula I listed below in Table 4, where unless noted otherwise $R_1$ in each is $CH_3$.

TABLE 4

| Ex. | $R_2/R_3$ | $R_4/R_5$ | Q/Alk |
|---|---|---|---|
| 101 | CH₃ / H | H / H | 3-OCHO / CH₂ |
| 102 | CH₃ / H | H / H | 4-CH₂CH₂OCHO / CH₂ |
| 103 | CH₃ / H | H / H | 4-(CH₂)₆OCOC₆H₅ / CHCH₃ |
| 104 | CH₃ / H | H / H | 4-(4-FC₆H₄COOCH₂) / CH₂CH₂ |
| 105 | CH₃ / 4-(CH₃)₂CH | H / H | 4-(2-ClC₆H₄COOCH₂CH₂) / (CH₂)₃ |
| 106 | CH₃ / 4-(CH₃)₃C | H / H | 4-[4-BrC₆H₄COO(CH₂)₄] / (CH₂)₄ |
| 107 | (CH₃)₂CH / H | H / H | 4-(4-IC₆H₄COOCHCH₃) / (CH₂)₅ |
| 108 | (CH₃)₃C / 4-CH₃ | H / 2-CH₃ | 6-(3-CH₃C₆H₄COOCH₂CH₂) / CH₂CH(CH₃) |
| 109 | C₂H₅ / 4-CH₃ | H / 2-CH₃ | 4-(4-iso-C₄H₉C₆H₄COO) / CH(CH₃)CH₂ |
| 110 | CH₃ / 3-CH₃ | H / 2,2,4,6-tetra-CH₃ | 4-(4-HOC₆H₄COO) / CH(CH₃)CH₂CH₂ |
| 111¹ | C₂H₅ / 4-CH₃ | H / 2,2,6-tri-CH₃ | 4-(4-CH₃OC₆H₄COO) / CH₂ |
| 112 | CH₃ / H | CH₃ / 2,2-di-CH₃-6-(CH₃)₂CHCH₂ | 4-(4-n-C₄H₉OC₆H₄COO) / CH₂ |
| 113 | CH₃ / H | C₂H₅ / 2,2,6,6-tetra-CH₃-4-C₂H₅ | 4-(3,4-OCH₂OC₆H₃COO) / CH₂ |
| 114 | CH₃ / H | H / H | 4-[4-CH₃SC₆H₄COO(CH₂)₆] / CH₂ |
| 115 | CH₃ / H | H / H | 4-[4-CH₃SOC₆H₄COO(CH₂)₆] / CH₂ |
| 116 | CH₃ / H | H / H | 4-[4-CH₃SO₂C₆H₄COO(CH₂)₆] / CH₂ |
| 117 | CH₃ / H | H / H | 4-[4-(CH₃)₂CHSC₆H₄COO] / CH₂ |
| 118 | CH₃ / H | H / H | 4-[4-(CH₃)₂CHSOC₆H₄COO] / CH₂ |
| 119 | CH₃ / H | H / H | 4-[4-(CH₃)₂-CHSO₂C₆H₄COO] / CH₂ |
| 120 | CH₃ / H | H / H | 4-(4-NH₂C₆H₄COO) / CH₂ |
| 121 | CH₃ / H | H / H | 4-(4-CH₃CONHC₆H₄COO) / CH₂ |
| 122 | CH₃ / H | CH₃CH₂CH₂ / H | 4-[3,4-(CH₃O)₂C₆H₃COO] / CH₂ |
| 123 | CH₃ / H | n-C₄H₉ / H | 4-[3-Cl-4-CH₃C₆H₃COO] / CH₂ |

¹ $R_1$ is $C_2H_5$.

Example 124

α-[1-(4-carbamyloxypiperidyl)]-2,6-dimethyl-acetanilide [I; $R_1$ and $R_2$ are CH₃, $R_3$, $R_4$ and $R_5$ are H, Q is 4-OCONH₂, Alk is CH₂].—By reacting α-[1-(4-hydroxypiperidyl)]-2,6-dimethyl-acetanilide with one molar equivalent of phosgene in the presence of one molar equivalent of N,N-dimethylaniline in a chloroform solution at a temperature around 5° C. and reacting the resulting chloroformyloxypiperidyl-acetanilide with a molar excess of ammonia, there can be obtained α-[1-(4-carbamyloxypiperidyl)]-2,6-dimethylacetanilide.

Example 125

α-{1-[4-(2-N-methylcarbamyloxyethyl)piperidyl]}-2,6-dimethyl-acetanilide [I; $R_1$ and $R_2$ are CH₃, $R_3$, $R_4$ and $R_5$ are H, Q is 4-CH₂CH₂OCONHCH₃, Alk is CH₂].—By reacting α{1-[4-(2-hydroxyethyl)piperidy]}-2,6-dimethylacetanilide with one molar equivalent of phenyl chloroformate in a pyridine solution at a temperature around 15° C. and reacting the resulting phenoxyformyloxyethylpiperidyl-acetanilide with methylamine, there can be obtained α{1-[4-(2-N-methylcarbamyloxyethyl)piperidyl]}-2,6-dimethylacetanilide.

Examples 126–134

By following the manipulative procedures described above in Examples 124 or 125, substituting for the reactants used therein an appropriate 1-(hydroxy- or hydroxy-lower-alkylpiperidyl)-lower-alkanoylanilide and an appropriate amine, there can be obtained the compounds of Formula I listed below in Table 5.

TABLE 5

| Ex. | $R_1/R_2$ | $R_3/R_4$ | $R_5/Q$ | Alk |
|---|---|---|---|---|
| 126 | CH₃ / CH₃ | H / n-C₄H₉ | H / 4-OCONHCH(CH₃)₂ | CH₂ |
| 127 | CH₃ / CH₃ | 4-CH₃ / CH₃CH₂CH₂ | 2,6-di-CH₃ / 4-OCONHCH₃ | CH₂CH₂ |
| 128 | CH₃ / CH₃ | 3-CH₃ / C₂H₅ | 2,5-di-CH₃ / 4-CH₂CH₂OCONHCH(CH₃)₂ | (CH₂)₃ |
| 129 | C₂H₅ / C₂H₅ | 4-CH₃ / H | 2,4,6-tri-CH₃ / 4-OCONHC₄H₉(n) | CH(CH₃)CH₂ |
| 130 | CH₃ / C₂H₅ | 4-CH₃ / H | 2-CH₃ / 6-CH₂CH₂OCONHC₄H₉(n) | CH₂CH(CH₃) |
| 131 | CH₃ / (CH₃)₂CH | H / H | 2,2,6-tri-CH₃ / 4-OCON(C₄H₉)₂(n) | (CH₂)₄ |
| 132 | CH₃ / (CH₃)₃C | 4-CH₃ / H | 5-C₂H₅ / 2-CH₂CH₂OCON(C₄H₉)₂(n) | CH(CH₃)CH₂CH₂ |
| 133 | CH₃ / CH₃ | 4-(CH₃)₂CH / CH₃ | 2,2-di-CH₃-6-(CH₃)₂CHCH₂ / 4-OCON(C₂H₅)(CH₃) | (CH₂)₅ |
| 134 | C₂H₅ / CH₃ | 4-(CH₃)₃C / H | 3-C₂H₅ / 4-CH₂CH₂OCON(C₂H₅)(CH₃) | CH₂ |

The intermediate N-lower-alkyl substituted-anilines used in the preparation of the halo-lower-alkanoyl-N-lower-alkylanilides are prepared by reducing the corresponding N-lower-alkanoyl-substituted-anilines with an alkali metal aluminum hydride, for example, lithium aluminum hydride, in an organic solvent inert under the conditions of the reaction, for example, ether or tetrahydrofuran. The products are isolated from an alkaline medium. The following intermediate N-lower-alkyl-substituted-anilines were thus prepared:

N-methyl-2,6-dimethylaniline, B.P. 89–90° C./14.7 mm., $n_D^{25}$, 1.5356, prepared from N-formyl-2,6-dimethylaniline.

Analysis.—Calcd. for $C_9H_{13}N$: N, 10.35. Found: N, 10.22.

N-ethyl-2,6-dimethylaniline, B.P. 93–95° C./15 mm., $n_D^{25}$, 1.5225, prepared from N-acetyl-2,6-dimethylaniline.

Analysis.—Calcd. for $C_{10}H_{15}N$: N, 9.38. Found: N, 9.29.

N-propyl-2,6-dimethylaniline, B.P. 115.5–118.5° C./24 mm., $n_D^{25}$, 1.5177, prepared from N-propionyl-2,6-dimethylaniline.

Analysis.—Calcd. for $C_{11}H_{17}N$: N, 8.57. Found: N, 8.72.

The halo-lower-alkanoyl-N-lower-alkylanilides in turn are prepared from the N-lower-alkyl-substituted-anilines by reacting the latter with a slight molar excess of a halo-lower-alkanoyl halide. The reaction is preferably conducted in an organic solvent inert under the conditions of the reaction, for example benzene, toluene, xylene and the like, at a temperature in the range from about 70° C. to about 140° C. The following intermediate halo-lower-alkanoyl-N-lower-alkylanilides were thus prepared:

α-Chloroacetyl - N - methyl-2,6-dimethylanilide, M.P. 59.5–61° C. (uncorr.), prepared from N-methyl-2,6-dimethylaniline and α-chloroacetyl chloride.

Analysis.—Calcd. for $C_{11}H_{14}ClNO$: N, 6.63; Cl, 16.77. Found: N, 6.39; Cl, 16.90.

β-Chloropropionyl-N-methyl-2,6-dimethylanilide, B.P. 95–103° C./0.14 mm., $n_D^{25}$, 1.5357, prepared from N-methyl-2,6-dimethylaniline and β-chloropropionyl chloride.

Analysis.—Calcd. for $C_{12}H_{16}ClNO$: C, 63.82; H, 7.14; N, 6.20. Found: C, 63.83; H, 7.08; N, 6.30.

α-Bromopropionyl-N-methyl-2,6-dimethylanilide, M.P. 80–81.5° C. (uncorr.), prepared from N-methyl-2,6-dimethylaniline and α-bromopropionyl bromide.

Analysis.—Calcd. for $C_{12}H_{16}BrNO$: C, 53.34; H, 5.97; Br, 29.6. Found: C, 53.29; H, 5.77; Br, 29.4.

α-Chloroacetyl-N-ethyl-2,6-dimethylanilide, M.P. 42–44° C. (uncorr.), prepared from N-ethyl-2,6-dimethylaniline and α-chloroacetyl chloride.

Analysis.—Calcd. for $C_{12}H_{16}ClNO$: C, 64.04; H, 7.17; N, 6.22. Found: C, 63.97; H, 7.05; N, 6.23.

β-Chloropropionyl - N - ethyl-2,6-dimethylanilide, B.P. 100–102° C./0.1 mm., $n_D^{25}$, 1.5320, prepared from N-ethyl-2,6-dimethylaniline and β-chloropropionyl chloride.

Analysis.—Calcd. for $C_{13}H_{18}ClNo$: N, 5.84; Cl, 14.80. Found: N, 5.94; Cl, 15.00.

α-Chloroacetyl-N-propyl-2,6-dimethylanilide, M.P. 59–60° C. (uncorr.), prepared from N-propyl-2,6-dimethylaniline and α-chloroacetyl chloride.

Analysis.—Calcd. for $C_{13}H_{18}ClNO$: N, 5.84; Cl, 14.80. Found: N, 5.92; Cl, 15.00.

β-Chloropropionyl-N-propyl-2,6-dimethylanilide, B.P. 94–95° C./0.2 mm., prepared from N-propyl-2,6-dimethylaniline and β-chloropropionyl chloride.

Analysis.—Calcd. for $C_{14}H_{20}ClNO$: N, 5.53. Found: N, 5.64.

α-Bromopropionyl-N-propyl-2,6-dimethylanilide, M.P. 50.5–52° C. (uncorr.), prepared from N-propyl-2,6-dimethylaniline and α-bromopropionyl bromide.

Analysis.—Calcd. for $C_{14}H_{20}BrNO$: C, 56.45; H, 6.76; Br, 26.8. Found: C, 56.03; H, 6.52; Br, 26.8.

The compounds of my invention have pharmacodynamic properties, in particular, local anesthetic and anticonvulsant activities. Local anesthetic activity was determined according to the method of Bulbring and Wajda [J. Pharmacol. and Exptl. Therap. 85, 78 (1945)], by injecting aqueous solutions of the acid-addition salts intradermally on the backs of guinea pigs using varying concentrations of solutions graded at 0.3 log intervals. The sensitivity of the wheals thereby produced was tested every five minutes for a period of thirty minutes by pricking the skins with a set of six pinpricks spaced at about one second intervals. The score for each wheal was obtained by the addition of the number of pinpricks which failed to elicit the reflex skin twitch at each reading. The average score for each concentration was plotted against the log of the concentration. The concentration expected to yield a score of 5, which was taken as the threshold activity concentration ($TAC_5$) was estimated by extrapolation from the dose-response curves.

The irritancies of the compounds were determined using the trypan blue irritation test procedure described by Hoppe et al. [J. Am. Pharm. Assoc. 39, 147 (1950)], as modified by Luduena and Hoppe [J. Pharm. and Exptl. Therap. 104, 40 (1952)]. In the test, each compound in a saline solution was injected at three or more concentrations graded at 0.3 log intervals into ten test areas per concentration. The average irritation score for each concentration was plotted against the dose on semi-log paper and the value corresponding to a score of 4 was read from the graph. This value was called the threshold irritancy concentration-4 ($TIC_4$) and is taken to be the concentration expected to produce an average degree of irritation.

The toxicities of the compounds were determined by intravenous injection in mice at various dose levels, and the $ALD_{50}$; the average dose lethal to fifty percent of the animals at that dose level, was estimated.

The anticonvulsant activity of the compounds was determined in mice and cats by gauging the protective effect the compounds produced against shock induced either chemically or electrically. The intraperitoneal protective dose against maximal electroshock seizures (MES) induced in mice was determined from the percent of animals protected from the hind limb extensor component of the maximal seizure pattern as a function of dose. The intrapitoneal protective dose against chemoshock death was determined by intravenous injection of medicated mice with lethal doses of either strychnine hydrochloride (0.9 mg./kg.; 0.009% solution) or phenylenetetrazole (Metrazol; 100 mg./kg.; 1% solution) injected at a rate of 1 ml./min. The incidence of sixty minute survivors following either convulsant was used in determining the protective dose and at higher pretreatment dose levels, the incidence of complete protection from metrazol convulsions following the lethal dose was used in determining the protective dose.

The local anesthetic test data so-obtained for a number of the compounds of the invention are summarized in Table 6 below where each of the compounds is identified by the number of the example above in which the preparation of the compound is described.

TABLE 6

| Example | $TAC_5$ (percent) | $TIC_4$ (percent) | $ALD_{50}$ (mg./kg.) |
| --- | --- | --- | --- |
| 16 | 1.27 | 4.0 | 150 |
| 17 | 1.0 | 0.5 | 22 |
| 18 | 2.0 | 1.0 | 38 |
| 19 | 0.34 | | |
| 23 | 0.3 | 1.0 | 125 |
| 31 | 0.2 | 1.0 | 8.0 |
| 46 | 0.57 | 0.5 | 44 |
| 47 | 0.18 | >2.0 | 175 |
| 53 | 0.6 | 1.0 | 60 |
| 59 | 1.0 | 1.0 | 1 |

α-[1-(3-acetoxypiperidyl)]-2,6-dimethylacetanilide prepared above in Example 95 protected all animals in a group of six for two hours against electroshock-induced convulsions when premedicated with the compound at a 400 mg./kg. dose level. At 100 mg./kg. it protected forty percent of a group of animals for one hour against maximal electroshock seizures.

My piperidyl-lower-alkanoylanilide derivatives can be formulated in the manner conventional for local anesthetics. For example, they can be conveniently used as their acid-addition salts, for example hydrochlorides, in aqueous liquid preparations. These preparations can be administered topically or injected intramuscularly or intravenously. My compounds can also be advantageously combined with other pharmacologically active compounds, e.g., vasoconstrictor agents.

When used as anticonvulsants, the compounds can be formulated in unit dosage form as tablets in combination with suitable adjuvants such as calcium carbonate, starch, talc, magnesium stearate, gum acacia, and the like, or alternatively they can be employed in capsule form either alone or admixed with an adjuvant. Still further, the compounds can be formulated for oral administration as aqueous alcohol solutions, oil solutions or oil-water emulsions in the same manner in which conventional medicinal substances are prepared.

I make no claim to the intermediate 3- and 4-lower-alkanoylaminopiperidines, which are the invention of Franklin W. Gubitz and who is filing a United States patent application disclosing and claiming these substances.

I claim:
1. A member of the goup consisting of (A) compounds of the formula

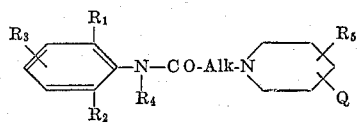

wherein $R_1$ and $R_2$ represent lower-alkyl; $R_3$ and $R_4$ represent a member of the group consisting of hydrogen and lower-alkyl; $R_5$ represents a member of the group consisting of hydrogen and from one to five lower-alkyls; Q represents a member of the group consisting of hydroxy, lower-alkoxy, lower-alkanoyloxy, monocarbocyclic aroyloxy, unsubstituted carbamyloxy, N-lower-alkylcarbamyloxy, N,N-di-lower-alkylcarbamyloxy, hydroxy-lower-alkyl, lower-alkoxy-lower-alkyl, lower-alkanoyloxy-lower-alkyl, monocarbocyclic aroyloxy-lower-alkyl, unsubstituted carbamyloxy-lower-alkyl, N-lower-alkylcarbamyloxy-lower-alkyl, N,N - di-lower-alkylcarbamyloxy-lower-alkyl, carbo-lower-alkoxy, and lower-alkanoylamino; and Alk represents lower-alkylene containing from one to five carbon atoms; and wherein each lower-alkyl moiety contains form one to four carbon atoms, each lower-alkoxy moiety contains from one to six carbon atoms, each lower-alkanoyloxy moiety contains from one to six carbon atoms, each hydroxy-lower-alkyl group contains from one to six carbon atoms, and each lower-alkanoylamino moiety contains from one to six carbon atoms; (B) acid-addition salts; and (C) lower-alkyl, lower alkenyl, and monocarbocyclic aryl-lower-alkyl quaternary ammonium salts thereof.

2. An acid-addition salt of a compound of the formula

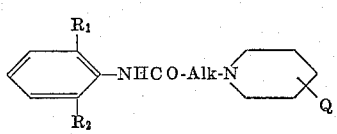

wherein $R_1$ and $R_2$ represent lower-alkyl of from one to four carbon atoms, Alk represents lower-alkylene of from one to five carbon atoms and Q represents hydroxy.

3. An acid-addition salt of a compound of the formula

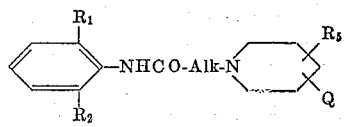

wherein $R_1$ and $R_2$ represent lower-alkyl of from one to four carbon atoms, $R_5$ represents from one to five lower-alkyls each of from one to four carbon atoms, Alk represents lower-alkylene of from one to five carbon atoms, and Q represents hydroxy.

4. An acid-addition salt of a compound of the formula

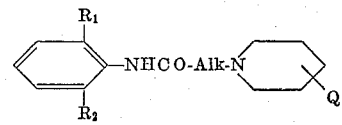

wherein $R_1$ and $R_2$ represent lower-alkyl of from one to four carbon atoms, Alk represents lower-alkylene of from one to five carbon atoms, and Q represents lower-alkanoyloxy of from one to six carbon atoms.

5. An acid-addition salt of a compound of the formula

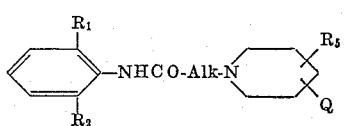

wherein $R_1$ and $R_2$ represent lower-alkyl of from one to four carbon atoms, $R_5$ represents from one to five lower-alkyls each of from one to four carbons atoms, Alk represents lower-alkylene of from one to five carbon atoms and Q represents lower-alkanoyloxy of from one to six carbon atoms.

6. An acid-addition salt of a compound of the formula

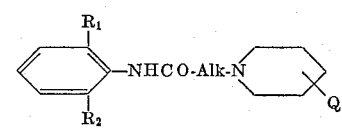

wherein $R_1$ and $R_2$ represent lower-alkyl of from one to four carbon atoms, Alk represents lower-alkylene of from one to five carbon atoms, and Q represents hydroxy-lower-alkyl of from one to six carbon atoms.

7. An acid-addition salt of a compound of the formula

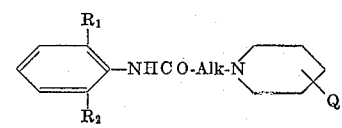

wherein $R_1$ and $R_2$ represent lower-alkyl of from one to four carbon atoms, Alk represents lower-alkylene of from one to five carbon atoms, and Q represents carbo-lower-alkoxy of from one to six carbon atoms in the lower-alkoxy moiety.

8. An acid-addition salt of a compound of the formula

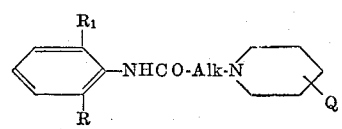

wherein $R_1$ and $R_2$ represent lower-alkyl of from one to four carbon atoms, Alk represents lower-alkylene of from one to five carbon atoms, and Q represents lower-alkanoylamino of from one to six carbon atoms.

9. An acid-addition salt of α-[1-(4-hydroxypiperidyl)]-2,6-dimethylacetanilide.

10. An acid-addition salt of α-[1-(2,4,6-trimethyl-4-hydroxypiperidyl)]-2,6-dimethylacetanilide.

11. An acid-addition salt of α-[1-(3-acetoxypiperidyl)]-2,6-dimethylacetanilide.

12. An acid-addition salt of α-[1-(2-hydroxymethylpiperidyl)]-2,6-dimethylacetanilide.

13. α - {1 - [4 - (1 - hydroxyethyl)piperidyl]} - 2,6-dimethylacetanilide hydrochloride.

14. α - {1 - [4 - (2 -hydroxyethyl)piperidyl]} - 2,6-dimethylacetanilide hydrochloride.

15. An acid-addition salt of α-{1-[4-(3-hydroxypropyl)-piperidyl]}-2,6-dimethylacetanilide.

16. An acid-addition salt of α-[1-(4-carbethoxypiperidyl)]-2,6-dimethylacetanilide.

17. An acid-addition salt of α-[1-(3-acetylaminopiperidyl)]-2,6-dimethylacetanilide.

References Cited in the file of this patent

UNITED STATES PATENTS

| | | |
|---|---|---|
| 2,762,842 | Hafliger et al. | Sept. 11, 1956 |
| 2,901,487 | Elpern | Aug. 25, 1959 |
| 2,914,532 | Elpern | Nov. 24, 1959 |
| 2,966,518 | Johnson | Dec. 27, 1960 |
| 2,976,291 | Jacob et al. | Mar. 21, 1961 |

FOREIGN PATENTS

| | | |
|---|---|---|
| 755,203 | Great Britain | Aug. 15, 1956 |

OTHER REFERENCES

Swain et al.: "J. Am. Chemical Society," vol. 79, pages 5250–5253 (1957).

UNITED STATES PATENT OFFICE
CERTIFICATE OF CORRECTION

Patent No. 3,124,586　　　　　　　　　　　　　　March 10, 1964

Bernard L. Zenitz

It is hereby certified that error appears in the above numbered patent requiring correction and that the said Letters Patent should read as corrected below.

Column 6, lines 46 and 47, for "M.P. 65.0-2° C." read -- M.P. 65.0-69.2° C. --; column 9, lines 1 and 2, for "Calcd. for $C_8H_{16}N_2O$: C, 61.49; H, 10.32; $N_B$, 8.97. Found: C, 61.31; H, 10.20; $N_B$ 8.98." read -- Calcd. for $C_7H_{14}N_2O \cdot HCl$: N, 15.69; Cl, 19.85. Found: N, 15.63; Cl, 19.76. --; line 47, for "$C_8H_{16}N_2O \cdot CHl$:" read -- $C_8H_{16}N_2O \cdot HCl$: --; column 13, line 46, for "$CH_2[$." read -- $CH_2]$. --; columns 13 and 14, TABLE 2, third column, line 26 thereof, for "$4_2CH_3$" read -- $4-CH_3$ --; columns 15 and 16, TABLE 2-Continued, third column, line 18 thereof, for "$4-CH_3$" read -- $3-CH_3$ --.

Signed and sealed this 15th day of September 1964.

(SEAL)
Attest:

ERNEST W. SWIDER　　　　　　　　　　　　　　EDWARD J. BRENNER
Attesting Officer　　　　　　　　　　　　　Commissioner of Patents